(12) United States Patent
Kulig et al.

(10) Patent No.: US 11,220,595 B2
(45) Date of Patent: Jan. 11, 2022

(54) REINFORCED RUBBER CONTAINING SILYLATED TRIGLYCERIDE OIL

(71) Applicant: THE GOODYEAR TIRE & RUBBER COMPANY, Akron, OH (US)

(72) Inventors: Joseph John Kulig, Tallmadge, OH (US); Kelsey Elizabeth Cantwell, Akron, OH (US); George Jim Papakonstantopoulos, Medina, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 187 days.

(21) Appl. No.: 16/806,235

(22) Filed: Mar. 2, 2020

(65) Prior Publication Data

US 2020/0283610 A1 Sep. 10, 2020

Related U.S. Application Data

(60) Provisional application No. 62/813,476, filed on Mar. 4, 2019.

(51) Int. Cl.
| | | |
|---|---|---|
| *C08L 25/10* | (2006.01) | |
| *C08L 23/16* | (2006.01) | |
| *C08L 91/00* | (2006.01) | |
| *C08F 36/06* | (2006.01) | |
| *C08F 36/08* | (2006.01) | |
| *C08K 5/103* | (2006.01) | |
| *C08K 3/04* | (2006.01) | |
| *C08K 5/5419* | (2006.01) | |
| *C08K 5/548* | (2006.01) | |
| *B60C 1/00* | (2006.01) | |
| *C08K 3/06* | (2006.01) | |
| *C08K 3/26* | (2006.01) | |
| *C08K 3/34* | (2006.01) | |
| *C08K 3/36* | (2006.01) | |

(52) U.S. Cl.
CPC .......... *C08L 25/10* (2013.01); *B60C 1/0016* (2013.01); *B60C 1/0025* (2013.01); *C08F 36/06* (2013.01); *C08F 36/08* (2013.01); *C08K 3/04* (2013.01); *C08K 3/06* (2013.01); *C08K 3/26* (2013.01); *C08K 3/346* (2013.01); *C08K 3/36* (2013.01); *C08K 5/103* (2013.01); *C08K 5/548* (2013.01); *C08K 5/5419* (2013.01); *C08L 23/16* (2013.01); *C08L 91/00* (2013.01); *C08K 2003/265* (2013.01)

(58) Field of Classification Search
CPC .......... C08L 25/10; C08L 23/16; C08L 91/00; C08K 3/36; C08K 3/34; C08K 3/26; C08K 3/06; C08F 36/06; C08F 36/08
USPC ...................................................... 523/156
See application file for complete search history.

(56) References Cited

U.S. PATENT DOCUMENTS

| | | |
|---|---|---|
| 3,055,956 A | 9/1962 | Paulsen |
| 3,317,458 A | 5/1967 | Clas et al. |
| 3,686,113 A | 8/1972 | Burke, Jr. |
| 3,767,605 A | 10/1973 | Gerlicher |
| 3,768,537 A | 10/1973 | Hess et al. |
| 3,907,734 A | 9/1975 | Ten Broeck et al. |
| 4,481,329 A | 11/1984 | Ambler |
| 4,482,657 A | 11/1984 | Fischer et al. |
| 5,227,425 A | 7/1993 | Rauline |
| 5,405,897 A | 4/1995 | Segatta et al. |
| 5,985,953 A | 11/1999 | Lightsey et al. |
| 6,025,415 A | 2/2000 | Scholl |
| 6,306,949 B1 | 10/2001 | Materne et al. |
| 6,323,260 B1 | 11/2001 | Koski et al. |
| 6,407,153 B1 | 6/2002 | von Hellens |
| 6,420,456 B1 | 7/2002 | Koski |
| 6,433,064 B1 | 8/2002 | Gori et al. |
| 6,433,065 B1 | 8/2002 | Lin et al. |
| 6,465,670 B2 | 10/2002 | Thise et al. |
| 6,537,612 B1 | 3/2003 | Koski et al. |

(Continued)

FOREIGN PATENT DOCUMENTS

| | | |
|---|---|---|
| DE | 1188797 | 3/1965 |
| EP | 2733170 A1 | 5/2014 |
| EP | 3351405 A1 | 7/2018 |
| FR | 2558008 | 4/1987 |
| FR | 2558874 | 4/1987 |
| FR | 2804199 | 7/2001 |
| WO | 2010042715 A1 | 4/2010 |

OTHER PUBLICATIONS

Extended European Search Report dated Jul. 20, 2020 for EP Patent Application 20160742.1, the EP counterpart to the subject patent application.

*Primary Examiner* — Deve V Hall
(74) *Attorney, Agent, or Firm* — Alvin T. Rockhill (57) ABSTRACT

It has been unexpected found that silylated triglyceride oils can be incorporated into tire tread rubber formulations that include reinforcing fillers to provide improved wet traction characteristic, rolling resistance, and tread-wear without compromising cured stiffness (dry traction) and ultimate properties (chip/chunk resistance). The level of silica coupling agent needed in such formulation can also typically reduced. The present invention more specifically discloses a rubber formulation which is comprised of (1) a rubbery polymer; (2) a reinforcing filler, such as silica or carbon black; and (3) a silylated triglyceride oil. The silylated triglyceride oil will include silyl groups of the structural formula: —$(CH_2)_n$—$Si(OR)_3$, wherein n represents an integer within the range of 1 to 8, and wherein R represents an alkyl group containing from 1 to 8 carbon atoms.

18 Claims, 1 Drawing Sheet

(56) References Cited

U.S. PATENT DOCUMENTS

| | | |
|---|---|---|
| 6,608,145 B1 | 8/2003 | Lin et al. |
| 8,357,733 B2 | 1/2013 | Wallen et al. |
| 10,087,306 B2 | 10/2018 | Puhala et al. |
| 2004/0016493 A1* | 1/2004 | Sandstrom ............ B60C 1/0008 152/450 |
| 2014/0135437 A1* | 5/2014 | Sandstrom ............. C08L 21/00 524/313 |
| 2014/0194567 A1* | 7/2014 | Narayan ................ C08G 77/50 524/588 |

\* cited by examiner

REINFORCED RUBBER CONTAINING SILYLATED TRIGLYCERIDE OIL

This patent application claims the benefit of U.S. Provisional Patent Application Ser. No. 62/813,476, filed on Mar. 4, 2019. The teachings of U.S. Provisional Patent Application Ser. No. 62/813,476 are incorporated herein by reference in their entirety.

BACKGROUND OF THE INVENTION

The benefit of including one or more reinforcing fillers in rubber formulations has been appreciated for over a century. To attain needed performance characteristics, carbon black has been widely used in making rubber formulations for use in a wide variety of rubber products, such as tires, power transmission belts, conveyor belts, hoses, air springs, and the like, for many decades. Reinforcing silicas, including, but not limited to, rice hulled ash silica and chemically modified silicas, are also widely used in a variety of industrial products. Non-reinforcing and semi-reinforcing fillers, such as clay, talc, lignin, diatomaceous earth, calcium carbonate, titanium dioxide, aluminum-trihydrate, and the like, have also been used in making a wide variety of rubber products. For over 25 years silica has been employed as a reinforcing filler in conjunction with carbon black in tire tread compounds.

In recent years the use of silica as a reinforcing agent in rubber formulations has grown significantly in importance. In fact, today silica is widely used in rubber formulations as a replacement, or more typically a partial replacement, for carbon black in rubber articles, such as tires. This is because silica reinforcement offers numerous benefits over conventional compounding with carbon black. For instance, U.S. Pat. No. 5,227,425 indicates that tires made with tread formulations that contain silica exhibit a number of important performance advantages over tires manufactured using carbon black as the filler. More specifically, the utilization of silica in tire tread formulations is believed to (a) lower rolling resistance, (b) provide better traction on wet surfaces and snow, and (c) lower noise generation, when compared with conventional tires filled with carbon black.

Sometimes rubber for tires is supplied by a rubber producer to a tire manufacturer in the form of a masterbatch containing an elastomer, an oil extender, and a filler. The traditional filler has been carbon black in the form of fine particles. These particles have hydrophobic surface characteristics and will therefore disperse easily within the hydrophobic elastomer. In contrast, silica has a very hydrophilic surface and considerable difficulty has been encountered in dispersing silica in the hydrophobic rubbery elastomer.

A number of techniques have been developed to incorporate such reinforcing agents and fillers into the polymer compositions, including both wet and dry blending processes. The incorporation of silica and carbon black as reinforcing agents and/or fillers into rubbery elastomers is far more complex than one might initially believe. One problem in wet blending of silica with latices of such polymers arises from the fact that the hydrophilic silica has a tendency to associate with the aqueous phase and not blend uniformly with the hydrophobic polymer.

To overcome the problems associated with the hydrophilic nature of the silica, U.S. Pat. No. 3,317,458 proposed a process whereby an aqueous solution of silicic acid was treated so as to precipitate silica directly onto the surface of an aqueous carbon black in paste form. One significant limitation of this technique is that the surface of the carbon black is altered thus obviating the utility of the many surface structure characteristics of specialty carbon blacks available to the skilled compounder in designing filled, reinforced polymers for specific end uses.

Attempts have been made to use cationic emulsifiers in an effort to distribute such fillers and/or reinforcing agents in polymeric lattices; notably among them are quaternary alkylated ammonium halides (see German Patent No. 1,188,797). It has been found, however, that such quaternary ammonium compounds have a tendency to react with the carbon black, dispersing it into the aqueous phase; that limiting the ability to blend carbon black with the polymeric components in the latex. In U.S. Pat. No. 3,686,113, wet silica is treated with oleophilic quaternary ammonium compounds to blend with an aqueous dispersion of an elastomer containing an anionic dispersing agent. In addition to the problem referenced above with carbon black dispersion, unfortunately, such techniques require specific coagulating agents.

Perhaps the most commonly employed practice used commercially is the technique of dry blending either silica, carbon black or both of them into rubber and thermoplastic polymers in a high-shear milling operation. That practice has many limitations. Notable among them include the tendency of the filler particles to agglomerate to each other, resulting in non-uniform dispersion of the filler throughout the polymer constituting the continuous phase. Another problem commonly experienced in such high-shear milling operations is the tendency of the polymers to degrade during milling. This necessitates the use of higher molecular weight polymers, which sometimes require the incorporation of various types of processing aids to facilitate mixing and dispersion of the filler particles into the polymer constituting the continuous phase. The cost associated with the use of such conventional processing aids also increases the manufacturing cost of the polymeric compound or article and can lead to diminished product performance. The use of conventional processing aids has the further disadvantage in that such processing aids may have a negative effect on the cure or end use of the polymer. Such dry blending techniques also result in additional processing costs, in part due to excessive equipment wear caused by the abrasive fillers.

To improve dispersion of the silica during dry mixing, it has been proposed that such compounding operations employ a silica which has been treated with an organosilane coupling agent having dual functionality. Representative of such coupling agents are those well-known compounds that include both an organic group, such as an amino alkyl group, a mercaptoalkyl group, or a polysulfidic-bis-organo alkoxy silane group bonded directly to the silicon atom along with a readily hydrolyzable group, such as an alkoxy group as represented by a methoxy group or an ethoxy group, likewise bonded directly to the silicon atom. In those systems, it is generally recognized that the alkoxy group hydrolyzes in the presence of moisture typically found on the surface of the silica to form the corresponding silanol which reacts with or condenses in the presence of the silica surface to bond the silicon atom to the silica surface. The organic groups likewise attached to the silicon atom are thus available for chemical reaction with the polymer matrix during vulcanization. As a result, the polymer matrix may become chemically bonded by means of the coupling agent to the silica surface during cure or vulcanization of the polymer. Problems associated with the use of such silanes during compounding are unpleasant odors, premature curing, and/or scorching.

In an effort to overcome the problems associated with the use of silane coupling agents, it has been proposed in U.S. Pat. No. 5,405,897 to employ phenoxy acidic acid along with a methylene donor in place of the conventional organosilanes. The foregoing patent suggests that the use of such a system provides improved physical properties and reduced viscosity of the melt during compounding.

Various other attempts have been made to overcome the problems associated with wet blending such fillers and/or reinforcing agents with polymer latices. For example, it has been proposed, as described in U.S. Pat. Nos. 3,055,956 and 3,767,605 to add carbon black in the form of a slurry directly to an emulsion polymerization process of rubbery polymer, at the latex stage, followed by coagulation and recovery of a rubber-carbon black masterbatch. Such processes work well with carbon black, but fail to incorporate substantial amounts of fine particulate silica. U.S. Pat. No. 4,481,329 proposes a process for dispersing carbon black and like fillers into concentrated rubber latices by the use of a low molecular weight conjugated diene/carboxylic acid polymer in the form of an alkali metal salt dissolved in water as the dispersing aid or dispersing latex.

U.S. Pat. No. 4,482,657 describes mixtures of silica and synthetic polymers prepared by treating a polymer latex with a dispersion of silica and an alkyl trimethyl ammonium halide in water. The presence of a quaternary ammonium halide in this process necessitates the slow addition of the silica dispersion to prevent premature coagulation. Other elaborate techniques as described in U.S. Pat. No. 3,907,734 where a partitioning agent in the form of a blend of precipitated silica and hydrophobic fumed silica are incorporated into a concentrated polymer latex have been suggested. The fumed silica adsorbs the water, and the resulting solid mixture is dried with removal of the hydrophobic fumed silica to form a free flowing blend of polymer particles coated with precipitated silica. That process is limited to relatively small scale batch system and requires recovery and recycle of the hydrophobic fumed silica. That process fails to incorporate into the polymer the more desirable hydrophobic fumed silica.

U.S. Pat. No. 8,357,733 describes a process for making silica filled rubber masterbatch using silica hydrophobated with a trimethoxy silane coupling agent that is soluble in alcohol-water solution containing at least 70 weight percent water. Hydrophobated silica is mixed with latex polymer and incorporated into rubber during the coagulation of the latex. This process has the limitation that it requires that the polymer be an emulsion rather than solution polymerization prepared polymers that may have preferred properties.

Such processes with concentrated latex, as those skilled in the art can readily appreciate, involve complex procedures not only blending the silica with the polymer latex, but also in effecting its recovery when excess silica or carbon black must be employed. Another limitation of such processes is that recovery of the filled polymer directly from the latex stage without filtration and like treatment steps used to remove byproducts from the emulsion polymerization can have deleterious effects on the end use properties of the polymer thus recovered. Such problems can be seen in French Patent 2,558,008 and French Patent 2,558,874. In the first, the addition to a rubber latex of precipitated silica effects coagulation of the rubber polymer. In the second, a stable latex of derivatized silica and a carboxylated butadiene rubber is prepared to add to natural or synthetic elastomer latices. The derivatization of the silica is accomplished by treatment with polyamines, polyethylene amines or non-ionic polyoxyethylene. Such free agents are wholly incompatible with typical coagulation techniques used in the recovery of the emulsion process polymers.

It is well known that mercaptosilanes offer excellent coupling between rubber and silica, resulting in rubber compounds for tire treads with improved wet and ice skid resistance, rolling resistance and treadwear even at low loadings. For instance, U.S. Pat. No. 3,768,537 demonstrates the excellent compound properties that can be attained by the use of mercaptosilanes in silica loaded rubber compounds. However, as revealed by U.S. Pat. No. 6,433,065, the high reactivity of mercaptosilanes makes it impractical to use such silane coupling agents in applications where conventional Banbury mixing is employed. In cases where mercaptosilane coupling agents are used in silica compounds it is important to maintain a low temperatures (120° C. to 145° C.) to avoid premature crosslinking which proves to be a problem at higher temperatures. However, low mixing temperatures result in a marked reduction in the mechanical efficiency of mixing that is essential for an optimum dispersion of the silica. The longer mixing time at a low temperature results in a significant reduction in mixing productivity which in turn increases expense. Another drawback of using low temperatures for mixing without extended mixing duration is that less completed silanization occurs which results in the release of ethanol in downstream operations giving rise to porosity from the extrudate and reduced extrusion rates.

Using a combination of two silane coupling agents in silica compounds has been suggested in the patent literature. More specifically, U.S. Pat. No. 6,306,949 discloses the use of a combination of an organosilane disulfide and an organosilane tetrasulfide for silica compounds for enhanced processibility and improved compound properties. In such a process, the organosilane disulfide coupling agent is introduced during the non-productive stage of the mixing so that higher mixing temperatures can be used to mix the silica compounds to ensure a better dispersion of silica throughout the rubber compound. The organosilane tetrasulfide is introduced during the productive stage where the mixing temperature is low (100° C. to 120° C.) so that scorch of the compounds from premature crosslinking can be avoided. However, the very low temperature and short duration during the final pass of the mixing will not ensure sufficient silanization of the organosilane tertrasulfide in the silica compounds during compounding. Since the rate of silanization for tertrasulfide-type silane coupling agents is very low at a temperature lower than 120° C., ethanol is accordingly released during downstream operations, such as extrusions and curing.

U.S. Pat. No. 6,433,065 teaches the use of a small amount of a mercaptosilane coupling agent in combination with an allyl alkoxysilane for silica or silica/carbon black compounds in Banbury mixing. It is claimed that very high temperature mixing (170° C. to 185° C.) can be conducted without causing premature crosslinking of the compounds. U.S. Pat. No. 6,608,145 discloses the use of a small quantity of a organosilane tetrasulfide, bis(triethoxylsilylpropyl)tetrasulfide (TESPT) in combination with an allyl alkoxysilane. It is again claimed that very high temperatures (165° C. to 200° C.) could be used to mix silica or silica/carbon black compounds by Banbury mixing without causing premature crosslinking of the compounds. However, having a non-coupling silane (allyl alkoxysilane) in the silica compounds is not expected to enhance the interaction between silica and the polymeric chain, hence the performance of the silica compounds. U.S. Pat. Nos. 6,433,065 and 6,608,145 do not teach the use of mercaptosilane, singly or in combination with allyl alkoxysilane, for the preparation of silica masterbatches in a solvent system.

Different approaches are disclosed in the patent literature for the preparation of silica masterbatches. For example, U.S. Pat. No. 5,985,953 reveals the preparation of emulsion styrene-butadiene rubber (e-SBR) based silica masterbatches. U.S. Pat. No. 6,433,064 discloses a rubber composition based on emulsion styrene-butadiene rubber and a two step process for making such a composition. U.S. Pat. Nos. 6,407,153, 6,420,456, and 6,323,260 describe processes by which silica particles are first treated with a compound containing amino and silane groups, followed by treatment with a silane compound containing a hydrophobic group. Similarly, U.S. Pat. No. 6,537,612 discloses a process through which the silica particles are treated with different chemical species to render the silica surface hydrophobic. The treated silica is then mixed with solution styrene-butadiene rubber or polybutadiene rubber cement to make elastomer masterbatches. However, an aqueous silica slurry is the starting material for the preparation of the silica masterbatch in all those approaches. Either the silica slurry is prepared by mixing water with silica or an aqueous silica slurry from the precipitated silica production process which is used directly in making silica masterbatches. Silica slurries are used in those approaches on the basis of the conventional thinking that because of the hydrophilic nature of silica, water would be the ideal medium for the treatment of the silica in the preparation of silica masterbatches.

It is well known to those skilled in the art that it is difficult for the silane coupling agents to react directly with silica in an aqueous medium. Hence, transfer agents are disclosed in U.S. Pat. No. 6,465,670 and French Patent 2,804,119 to increase the chance for the silane coupling agent to react with the silica surface. U.S. Pat. Nos. 6,407,153 and 6,420,456 disclose the use of amino silane with alkyl terminations before introducing silane coupling agents. In addition to being a more complex process, the introduction of other chemical species prior to silane coupling agents render some of the reactive sites on the silica surface unavailable for the silanization process.

U.S. Pat. No. 6,025,415 discloses a process through which silica powder could be rendered water-repellent and the dried water-repellent silica could be incorporated into solution elastomer cements in an organic solvent.

U.S. Pat. No. 10,087,306 is based upon the discovery that the silica compounding additives can be included in silica reinforced rubber formulations to increase the low strain dynamic stiffness exhibited by the rubber composition without a substantial increase in the cured compound hysteresis. This increase in stiffness allows for use of process aids that would otherwise result in an unacceptable further reduction in low strain dynamic stiffness. U.S. Pat. No. 10,087,306 specifically discloses a rubber formulation which is comprised of (1) a rubbery polymer, (2) a reinforcing silica, and (3) a silica compounding additive of the structural formula:

wherein M represents a divalent metal (typically zinc, calcium, or magnesium) and wherein $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups.

There continues to be a long felt need for silica filled rubber formulations that process better (have better extrusion quality) and which exhibit a higher level of dynamic stiffness. However, it is important for these objectives to be attained without compromising other desirable attributes of the silica filler rubber formulation, such as maintaining a low level of hysteresis. The use of silica reinforced tire tread compounds containing organofunctional silanes as coupling agents results in substantial performance benefits, including lower hysteresis and improved wet and ice traction. Unfortunately, these improvements in performance are usually accompanied by difficult tread compound processing due to high Mooney viscosity and reduced tire handling performance due to low dynamic stiffness at low strains of the cured rubber tread. Typical polysulfide silanes used in silica filled tire treads serve to hydrophobate the silica surface, reducing the silica "filler-filler" network resulting in a reduction of dynamic stiffness at low strain levels of the compound. Blocked mercaptosilanes (e.g., 3-octanoylthio-1-propyltriethoxysilane) further amplify this effect. Unlike silica filled tire tread compounds containing polysulfide silanes or blocked mercaptosilanes, carbon black filled tread compounds have high levels of dynamic stiffness at low strain due to the inherent "filler-filler" network formed by the carbon black. This high level of dynamic stiffness at low strain is advantageous for improved tire handling performance. However, this carbon black network also results in a substantial increase in hysteresis as compared to the silica/silane containing tread compounds. Furthermore, the high Mooney viscosity of the silica filled tire tread compounds often require the inclusion of a process additive that reduces the compound viscosity but also further reduces the low strain dynamic stiffness of the cured silica tread compound. Since low strain stiffness of the cured tread compound is a very important parameter for tire handling performance and since process additives reduce low strain dynamic stiffness, a way to increase in the low strain stiffness of a silica filled tread compound without a substantial detrimental increase in hysteresis is needed.

SUMMARY OF THE INVENTION

This invention is based upon the unexpected finding that silylated triglyceride oils can be incorporated into rubber formulations that include reinforcing fillers to improve the characteristics of the rubber formulation. In tire tread compounds this provides improved wet traction characteristic, rolling resistance, and tread-wear without compromising cured stiffness (dry traction) and ultimate properties (chip/chunk resistance). The use of such silylated triglyceride oils in silica reinforced rubber formulations also typically reduces the level of silica coupling agent needed in that formulation. The silylated triglyceride oil can be incorporated into virtually any synthetic rubber or natural rubber that includes a reinforcing filler to improve the performance characteristics of the rubber formulation. More specifically, the silylated triglyceride oil can be included in solution styrene-butadiene rubber (SSBR), emulsion styrene-butadiene rubber (ESBR), polybutadiene rubber, synthetic polyisoprene rubber, ethylene-propylene-diene rubber (EPDM), isoprene-butadiene rubber, styrene-isoprene-butadiene rubber, silicon rubber, nitrile rubber, carboxylated nitrile rubber, and the like. It is of particular value in making resin modified solution styrene-butadiene rubber (SSBR), emulsion styrene-butadiene rubber (ESBR), high cis-1.4-polybutadiene rubber, natural rubber, and synthetic polyisoprene rubber which are formulated for use in tire tread compounds.

The present invention discloses a rubber formulation which is comprised of (1) a rubbery polymer, and (2) a silylated triglyceride oil. The silylated triglyceride oil will include silyl groups of the structural formula: —$(CH_2)_n$—$Si(OR)_3$, wherein n represents an integer within the range of 1 to 8, and wherein R represents an alkyl group containing from 1 to 8 carbon atoms. The silylated triglyceride oil will typically include silyl groups of the structural formula: —S—$(CH_2)_n$—$Si(OR)_3$, wherein n represents an integer within the range of 1 to 8, and wherein R represents an alkyl group containing from 1 to 8 carbon atoms. For instance, the silylated triglyceride oil can include silyl groups of the structural formula: —S—$(CH_2)_3$—$Si(O$—$CH_2CH_3)_3$. A wide variety of triglyceride oils can be used in the practice of this invention with silylated vegetable oils being typically employed. Such silylated vegetable oils include, but are not limited to, silylated soybean oil, silylated canola oil (silylated Rapeseed oil), silylated corn oil, silylated cottonseed oil, silylated olive oil, silylated palm oil, and silylated safflower oil. In many cases the silylated triglyceride oil will be silylated soybean oil.

The present invention further reveals a rubber formulation which is comprised of (1) a rubbery polymer, (2) a reinforcing filler, and (3) a silylated triglyceride oil. The reinforcing filler will typically be a reinforcing silica or carbon black. The silylated triglyceride oil will include silyl groups of the structural formula: —$(CH_2)_n$—$Si(OR)_3$, wherein n represents an integer within the range of 1 to 8, and wherein R represents an alkyl group containing from 1 to 8 carbon atoms. The silylated triglyceride oil will typically include silyl groups of the structural formula: —S—$(CH_2)_n$—$Si(OR)_3$, wherein n represents an integer within the range of 1 to 8, and wherein R represents an alkyl group containing from 1 to 8 carbon atoms. For instance, the silylated triglyceride oil can include silyl groups of the structural formula: —S—$(CH_2)_3$—$Si(O$—$CH_2CH_3)_3$. A wide variety of triglyceride oils can be used in the practice of this invention with silylated soybean oil being commonly used.

The subject invention also discloses an oil extended rubber which is comprised of (1) a rubbery polymer, and (2) a silylated triglyceride oil. This silylated triglyceride oil extended rubber is particularly useful in rubber formulations which include reinforcing silica. In any case, virtually any synthetic rubber can be oil extended with silylated triglyceride oil in accordance with this invention. These synthetic rubbers include high-cis-1,4-polybutadiene rubber, medium vinyl-polybutadiene rubber, synthetic polyisoprene rubber, emulsion styrene-butadiene rubber (ESBR), solution styrene-butadiene rubber (SSBR), isoprene-butadiene rubber (IBR), styrene-isoprene-butadiene rubber (SIBR), and the like.

In making the silylated triglyceride oil extended rubbers of this invention the silylated triglyceride oil is typically added to the liquid polymerization medium (solution or emulsion) in which the synthetic rubber was synthesized. Then the silylated triglyceride oil extended rubber is recovered from the polymerization medium by coagulation or some other conventional means. An antioxidant is normally also added to protect the rubber from degradation. However, the silylated triglyceride oil rubber is generally void of rubber compounding chemicals other than the antioxidant. For instance, the silylated triglyceride oil extended rubber is usually void of fillers, such as carbon black and/or silica; plasticizers; resins; curatives, such as sulfur, sulfur containing compounds, and peroxides; waxes; accelerators; pigments; and processing aids, such as fatty acids including stearic acid. Accordingly, the silylated triglyceride oil extended rubber is frequently comprised of (1) the rubbery polymer, and (2) the silylated triglyceride oil, wherein the oil extended rubber is void of or essentially free of rubber chemicals and/or additives other than antioxidants. In such silylated triglyceride oil extended rubber which is essentially free of rubber chemicals the rubber chemical will be present in the rubber at a level where it does not appreciable effect the chemical or physical properties of the rubber. Accordingly, the present invention further reveals a silylated triglyceride oil extended rubber which is comprised of (1) a rubbery polymer, and (2) a silylated triglyceride oil, wherein the silylated triglyceride oil extended rubber is essentially free of rubber chemicals and additives other antioxidants. In most cases the silylated triglyceride oil extended rubber is totally void of such rubber chemicals and additives, such as fillers, plasticizers, resins, curatives, waxes, accelerators, pigments, and processing aids, The subject invention also reveals a method for producing a silylated triglyceride oil extended rubber which comprised adding a silylated triglyceride oil to a solution or emulsion of the rubber and then recovering the silylated triglyceride oil extended rubber from the solution or emulsion. In making such silylated triglyceride oil extended rubbers the silylated triglyceride oil can be added to the solution or emulsion of the rubber with other extended oils, such as triglyceride oils which are not silylated. For instance, the silylated triglyceride oil can represent from 10 weight percent to 100 weight percent of the total level of oils employed in oil extending the rubber. In many cases, the silylated triglyceride oil will represent from 10 weight percent to 30 weight percent, 30 weight percent to 50 weight percent, 50 weight percent to 70 weight percent, or 70 weight percent to 90 weight percent of the total level of extender oils employed in oil extending the rubber. Mixtures of the silylated triglyceride oil with vegetable oils, such as soybean oil, sunflower oil, canola (rapeseed) oil, corn oil, coconut oil, cottonseed oil, olive oil, palm oil, peanut oil, and safflower oil can be used in oil extending the rubber.

The present invention also discloses a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein at least one component of the tire is comprised of a cured rubber formulation which includes (1) a rubbery polymer, (2) a reinforcing silica, and (3) a silylated triglyceride oil. For instance, the cured rubber formulation which includes (1) the rubbery polymer, (2) the reinforcing silica, and (3) the silylated triglyceride oil can be in the tread or the sidewalls of the tire.

DETAILED DESCRIPTION OF THE INVENTION

The silylated triglyceride oil used in the practice of this invention will include silyl groups of the structural formula: —$(CH_2)_n$—$Si(OR)_3$, wherein n represents an integer within the range of 1 to 8, and wherein R represents an alkyl group containing from 1 to 8 carbon atoms. In many cases n will represent an integer within the range of 2 to 6 and R will represent an alkyl group containing from 1 to 4 carbon atoms. It is typically preferred for n to represent an integer within the range of 3 to 5 and for R to represent an alkyl group containing from 2 to 4 carbon atoms. The silylated triglyceride oil will typically include silyl groups of the structural formula: —S—$(CH_2)_n$—Si$(OR)_3$, wherein n represents an integer within the range of 1 to 8, and wherein R represents an alkyl group containing from 1 to 8 carbon atoms. For instance, the silylated triglyceride oil can include silyl groups of the structural formula: —S—$(CH_2)_3$—Si$(O-CH_2CH_3)_3$. The silylated triglyceride oil will typically be at least 30% silylated, based upon the mole percent of unsaturation in the starting triglyceride oil. In many cases, it will be advantageous to silylate the triglyceride oil to a level of at least 45 mole percent, 60 mole percent, 90 mole percent, or 99 mole percent, based upon the mole percent of unsaturation in the starting triglyceride oil. The triglyceride oil can also be silylated to lower levels of less than 30% wherein the silylated triglyceride oil will act as a mixture of silylated oil and unmodified oil and will perform to some extent as an extender oil.

The silylated triglyceride oil of this invention can be included in virtually any type of synthetic or natural rubber that includes a reinforcing filler to attain improved cured rubber properties. For example, solution styrene-butadiene rubber (SSBR), emulsion styrene-butadiene rubber (ESBR), polybutadiene rubber, synthetic polyisoprene rubber, ethylene-propylene-diene rubber (EPDM), isoprene-butadiene rubber, styrene-isoprene-butadiene rubber, silicon rubber, nitrile rubber, carboxylated nitrile rubber, and the like can be modified in accordance with this invention. It is of particular value in making resin modified solution styrene-butadiene rubber (SSBR), emulsion styrene-butadiene rubber (ESBR), high cis-1,4-polybutadiene rubber, and synthetic polyisoprene rubber which are formulated for use in tire tread compounds.

High cis-1,4-polybutadiene rubber which can be modified with a silylated triglyceride oil in accordance with this invention can be synthesized with a nickel based catalyst system in accordance with the teachings of U.S. Pat. No. 4,983,695. This method involves polymerizing 1,3-butadiene in a solution of an aliphatic and/or cycloaliphatic solvent system employing as a catalyst system a mixture of (1) an organonickel compound, (2) an organoaluminim compound and (3) a fluorine containing compound selected from the group consisting of hydrogen fluoride and hydrogen fluoride complexes prepared by complexing hydrogen fluoride with ketones, esters, ethers, alcohols, phenols and water, said polymerization being conducted in the presence of small amounts of an alpha olefin, such as ethylene or propylene. This technique more specifically involves synthesizing high cis-1,4-polybutadiene by polymerizing 1,3-butadiene in a solution of an aliphatic and/or cycloaliphatic solvent system employing as a catalyst system, a mixture of (1) a nickel salt of a carboxylic acid, (2) a trialkylaluminum compound, and (3) a fluorine containing compound prepared by complexing hydrogen fluoride with ethers; wherein the mole ratio of said trialkylaluminum compound to said nickel salt of a carboxylic acid ranges from about 0.3/1 to about 300/1, wherein the mole ratio of said fluorine containing compound to said nickel salt of a carboxylic acid ranges from about 0.5/1 to about 500/1, and wherein the mole ratio of the fluorine containing compound to the trialkylaluminum compound ranges from about 0.4/1 to about 15/1; said polymerization being conducted in the presence of 0.73 to 4.57 phm of propylene. A more detailed description of nickel based catalyst systems that can be used in the synthesis of high cis-1,4-polybutadiene rubber is provided in Canadian Patent 1,284,545. The teachings of Canadian Patent 1,284,545 are incorporated herein by reference for the purpose of disclosing such nickel based catalyst systems.

The high cis-1,4-polybutadiene can also be synthesized utilizing the method described in U.S. Pat. No. 5,698,643. This method comprises polymerizing 1,3-butadiene monomer in a solution of hexane at a temperature of about 65° C. employing as a catalyst system, a mixture of (1) nickel octanoate, (2) triisobutylaluminum and (3) a hydrogen fluoride complex which is prepared by complexing hydrogen fluoride with dibutyl ether, wherein the mole ratio of said triisobutylaluminum to said nickel octanoate is about 40:1, wherein the mole ratio of the hydrogen fluoride complex to said nickel octanoate is about 105:1, and wherein the mole ratio of the hydrogen fluoride complex to the triisobutylaluminum is about 2.6:1, said polymerization being conducted in the presence of 2 to 15 phm of isobutene which acts as a molecular weight regulator to reduce the molecular weight of the high cis-1,4-polybutadiene.

The high cis-1,4-polybutadiene can also by synthesized in accordance with the teachings of U.S. Pat. No. 5,451,646. This method comprises polymerizing 1,3-butadiene in the presence of (a) an organonickel compound, (b) an organoaluminum compound, (c) a fluorine containing compound, and (d) para-styrenated diphenylamine; wherein the organoaluminum compound and the fluorine containing compound are brought together in the presence of the para-styrenated diphenylamine. The teachings of U.S. Pat. Nos. 4,983,695, 5,698,643 and 5,451,646 are incorporated herein by reference.

The high cis-1,4-polybutadiene can also by synthesized utilizing a rare earth metal catalyst system. For instance, the use of rare earth metal compounds as components of organometallic mixed catalyst systems for the stereospecific polymerization of 1,3-butadiene monomer into high cis-1,4-polybutadiene is disclosed by U.S. Pat. No. 4,260,707. The catalyst system disclosed in U.S. Pat. No. 4,260,707 is comprised of (a) a reaction mixture formed by reacting a rare earth carboxylate and an aluminum compound wherein there are three hydrocarbon residues having from 1 to 20 carbon atoms attached to the aluminum, (b) a trialkyl aluminum and/or a dialkyl aluminum hydride and (c) a Lewis acid. An improved process for preparing conjugated diolefin polymers or copolymers having a high content of 1,4-cis-units and high chain linearity is disclosed in U.S. Pat. No. 4,444,903. In this process a catalytic system prepared from (a) at least one carboxylate or alcoholate of a rare earth element, (b) a tertiary organic halide and (c) an organo metallic aluminum compound not containing halide ions of the formula: $R_aR_bAlR_c$ in which $R_a$ and $R_b$ are alkyl residues and $R_c$ is hydrogen atom or an alkyl radical. Another example of the use of an organometallic mixed catalyst system containing a rare earth compound for producing a conjugated diene polymer is disclosed in U.S. Pat. No. 4,461,883. This process is characterized by polymerizing at least one conjugated diene with a catalyst consisting of (A) a reaction product of a Lewis base and a carboxylate of a rare earth element of the lanthanum series represented by $AlR_2R_3R_4$, wherein $R_2$, $R_3$, and $R_4$ which may be the same or different represent hydrogen or alkyl substituents, although $R_2$, $R_3$, and $R_4$ cannot all be hydrogen atoms and (C) an alkyl aluminum, and (D) optionally, a conjugated diene. The lanthanum based catalyst system can also be comprised of (1) a compound of a lanthanum series rare earth metal, (2) an organoaluminum compound, and (3) a halogen containing compound. The compounds of lanthanum series rare earth metal include carboxylates, alkoxides, thioalkoxides, halides, amides and the like of elements having an atomic number which is within the range of 57 to about 71, such as cerium, lanthanum, praseodymium, neodymium and gadolinium. Some representative examples of sources for the carboxylate, alkoxide or thioalkoxide octanoic acid, 2-ethylhexanoic acid, oleic acid, stearic acid, benzoic acid, naphthenic acid, 2-ethyl-hexylalcohol, oleyl alcohol, phenol, benzyl alcohol, thiophenol, and the like. In any case, the rare earth metal may be used alone or in a combination of two or more additional rare earth metals. In order to solubilize the compound of the lanthanum series rare earth element into a polymerization catalyst system, this compound may be used as a mixture or a reaction product with the Lewis base and/or Lewis acid, if necessary. Typically the use of a Lewis base is preferable. Some representative examples of Lewis bases that can be utilized include acetylacetone, tetrahydrofuran, pyridine, N,N'-dimethyl formamide, thiophene, diphenyl ether, triethylamine, organic phosphorus compound, mono- or bivalent alcohol and the like. The organoaluminum compound will typically be a trialkyl aluminum compound, such as triethyl aluminum, triisobutyl aluminum, triisopropyl aluminum, trihexyl aluminum and the like. Among them, triethyl aluminum, triisobutyl aluminum and trihexyl aluminum, and the like. The halogen containing compound will typically be a fluorine or a chlorine containing compound, such boron trifluoride, a hydrogen fluoride complex which is prepared by complexing hydrogen fluoride with dialkyl ether, or a halogenated aluminum compound. Such catalyst systems are described in greater detail in U.S. Pat. No. 4,533,711, the teachings of which are incorporated herein by reference for the purpose of disclosing useful catalyst systems.

The high cis-1,4-polybutadiene rubber will more typically have a cis-microstructure content of at least 94 percent and more frequently will have a cis-microstructure content of at least 95 percent. In many cases the high cis-1,4-polybutadiene rubber will have a cis-microstructure content of at least 96 percent, at least 97 percent, or even as high as at least 98 percent.

The synthetic polyisoprene rubber that can be formulated in accordance with this invention can be characterized by being comprised of high cis-polyisoprene rubber having a cis-microstructure content of at least 90 percent. The high cis-polyisoprene rubber can be neodymium polyisoprene rubber having a cis-microstructure content of at least 95 percent or at least 96 percent. In many cases the neodymium polyisoprene rubber will have a cis-microstructure content which is within the range of 96 percent to 98 percent, a trans-microstructure content of less than 0.5 percent, and a 3,4-microstructure content which is within the range of 2 percent to 4 percent. The neodymium polyisoprene rubber can be synthesized with a catalyst system three component catalyst system which includes (1) an organoaluminum compound, (2) an organoneodymium compound, and (3) at least one compound that contains at least one labile halide ion. Such a neodymium catalyst system is described in U.S. Pat. No. 6,780,948, the teachings of which are incorporated herein by reference. This patent describes a process for the synthesis of polyisoprene rubber which comprises polymerizing isoprene monomer in the presence of a neodymium catalyst system, wherein the neodymium catalyst system is prepared by (1) reacting a neodymium carboxylate with an organoaluminum compound in the presence of isoprene for a period of about 10 minutes to about 30 minutes to produce neodymium-aluminum catalyst component, and (2) subsequently reacting the neodymium-aluminum catalyst component with a dialkyl aluminum chloride for a period of at least 30 minutes to produce the neodymium catalyst system.

The synthetic polyisoprene rubber can also be a titanium polyisoprene rubber having a cis-microstructure content of at least 96 percent or 97 percent. For instance, the titanium polyisoprene rubber can have a cis-microstructure content which is within the range of 97 percent to 99 percent and a trans-microstructure content which is within the range of 1 percent to 3 percent. In some cases, the titanium polyisoprene rubber will have a 3,4-microstructure content which is within the range of 0.2 percent to 0.8 percent.

The synthetic polyisoprene rubber can also be lithium polyisoprene rubber having a cis-microstructure content of at least 86 percent. In many cases the lithium polyisoprene rubber will have a cis-microstructure content which is within the range of 88 percent to 92 percent, a trans-microstructure content which is within the range of 5 percent to 8 percent, and a 3,4-microstructure content which is within the range of 3 percent to 4 percent.

Emulsion styrene-butadiene rubber compositions can also be modified with a silylated triglyceride oil in accordance with this invention. The emulsion styrene-butadiene rubber will typically have a bound styrene content which with is within the range of 22 percent to 60 weight percent and a bound butadiene content which is within the range of 40 weight percent to 78 weight percent, wherein 60 percent to 70 percent of the bound butadiene repeat units in the emulsion styrene-butadiene rubber are of trans 1,4-microstructure, wherein 13 percent to 23 percent of the bound butadiene repeat units in the emulsion styrene-butadiene rubber are of cis-microstructure, and wherein 12 percent to 22 percent of the bound butadiene repeat units in the emulsion styrene-butadiene rubber are of vinyl-microstructure.

The emulsion styrene-butadiene rubber will typically have a bound styrene content which with is within the range of 22 percent to 60 weight percent and a bound butadiene content which is within the range of 40 weight percent to 78 weight percent. The emulsion styrene-butadiene rubber will more typically have a bound styrene content which is within the range of 24 percent to 32 weight percent and a bound butadiene content which is within the range of 68 weight percent to 76 weight percent. The emulsion styrene-butadiene rubber will more typically have a bound styrene content which is within the range of 27 percent to 30 weight percent and a bound butadiene content which is within the range of 70 weight percent to 73 weight percent. Typically, 62 percent to 68 percent of the bound butadiene repeat units in the emulsion styrene-butadiene rubber are of trans 1,4-microstructure, 15 percent to 21 percent of the bound butadiene repeat units in the emulsion styrene-butadiene rubber are of cis-microstructure, and 14 percent to 20 percent of the bound butadiene repeat units in the emulsion styrene-butadiene rubber are of vinyl-microstructure. More typically, 63 percent to 67 percent of the bound butadiene repeat units in the emulsion styrene-butadiene rubber are of trans 1,4-microstructure, 16 percent to 20 percent of the bound butadiene repeat units in the emulsion styrene-butadiene rubber are of cis-microstructure, and 15 percent to 19 percent of the bound butadiene repeat units in the emulsion styrene-butadiene rubber are of vinyl-microstructure. In many cases, 64 percent to 66 percent of the bound butadiene repeat units in the emulsion styrene-butadiene rubber are of trans 1,4-microstructure, 17 percent to 19 percent of the bound butadiene repeat units in the emulsion styrene-butadiene rubber are of cis-microstructure, and 16 percent to 18 percent of the bound butadiene repeat units in the emulsion styrene-butadiene rubber are of vinyl-microstructure.

Solution styrene-butadiene rubber compositions can also be modified with a silylated triglyceride oil made in accordance with this invention. The solution styrene-butadiene rubber will typically have a bound styrene content which with is within the range of 10 percent to 60 weight percent and a bound butadiene content which is within the range of 40 weight percent to 90 weight percent, wherein 25 percent to 55 percent of the bound butadiene repeat units in the solution styrene-butadiene rubber are of trans 1,4-microstructure, wherein 25 percent to 50 percent of the bound butadiene repeat units in the solution styrene-butadiene rubber are of cis-microstructure, and wherein 5 percent to 45 percent of the bound butadiene repeat units in the solution styrene-butadiene rubber are of vinyl-microstructure, wherein the solution styrene-butadiene rubber has a $M_z$ molecular weight of at least 800 kDa, and wherein the solution styrene-butadiene rubber has a ratio of Mz molecular weight to number average molecular weight of at least 1.58.

The solution styrene-butadiene rubber composition will typically have a bound styrene content which is within the range of 24 percent to 32 weight percent and a bound butadiene content which is within the range of 68 weight percent to 76 weight percent. The solution styrene-butadiene rubber will frequently have a bound styrene content which is within the range of 27 percent to 30 weight percent and a bound butadiene content which is within the range of 70 weight percent to 73 weight percent. Typically from 38 percent to 52 percent of the bound butadiene repeat units in the solution styrene-butadiene rubber will be of trans 1,4-microstructure, 28 percent to 48 percent of the bound butadiene repeat units in the solution styrene-butadiene rubber will be of cis-microstructure, and 6 percent to 30 percent of the bound butadiene repeat units in the solution styrene-butadiene rubber will be of vinyl-microstructure. More typically, from 40 percent to 50 percent of the bound butadiene repeat units in the solution styrene-butadiene rubber will be of trans 1,4-microstructure, 30 percent to 46 percent of the bound butadiene repeat units in the solution styrene-butadiene rubber will be of cis-microstructure, and 8 percent to 28 percent of the bound butadiene repeat units in the solution styrene-butadiene rubber will be of vinyl-microstructure.

The resin modified oil extended rubber can then be compounded with conventional rubber compounding materials and agents. The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, Page 304 (1930). The conventional silica may also be typically characterized by having a dibutylphthalate (DBP) absorption value in a range of about 100 to about 400, and more usually about 150 to about 300. The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein and without limitation, silicas commercially available from PPG Industries under the Hi-Sil trademark with designations 210, 243, etc.; silicas available from Rhodia, with, for example, designations of Z1165MP and Z165GR and silicas available from Degussa AG with, for example, designations VN2 and VN3, etc.

The vulcanizable rubber composition may include from about 5 to about 50 phr of carbon black. Commonly employed carbon blacks can be used as a conventional filler. Representative examples of such carbon blacks include N110, N121, N134, N220, N231, N234, N242, N293, N299, 5315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm.sup.3/100 g.

The rubber formulation can also be filled with a surface-treated-carbon-black. Such surface treated carbon black can be treated with peroxide or ozone which results in oxidation of the surface of the carbon black with polar, oxygen-containing functionalities. Such surface-treated carbon black is described in greater detail in United States Patent Publication No. 2013/0046064. The teachings of United States Patent Publication No. 2013/0046064 are incorporated herein by reference.

The vulcanizable rubber composition may include both silica and carbon black in a combined concentration of from about 50 to about 150 phr, in any weight ratio of silica to carbon black. In one embodiment, the vulcanizable rubber composition includes both silica and carbon black in approximately the same weight amounts, i.e., a weight ratio of about 1:1. Other fillers may be used in the resin modified oil extended rubber compositions such as particulate fillers, including ultra high molecular weight polyethylene (UHMWPE), particulate polymer gels, such as those disclosed in U.S. Pat. Nos. 6,242,534; 6,207,757; 6,133,364; 6,372,857; U.S. Pat. No. 5,395,891; or U.S. Pat. No. 6,127,488, and plasticized starch composite filler, such as that disclosed in U.S. Pat. No. 5,672,639. The teachings of U.S. Pat. Nos. 6,242,534; 6,207,757; 6,133,364; 6,372,857; 5,395,891; 6,127,488, and 5,672,639 are incorporated herein by reference.

The modified rubber formulations of this invention may additionally contain a conventional sulfur containing organosilicon compound. Examples of suitable sulfur containing organosilicon compounds which may be used in accordance with the present invention include: 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis (triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl) tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis (diphenyl cyclohexoxysilylpropyl)disulfide, 3,3'-bis(dimethyl ethylmercap layertosilylpropyl)tetrasulfide, 2,2'-bis (methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl) disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis (trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur containing organosilicon compounds are the 3,3'-bis(trimethoxy or triethoxy silylpropyl)sulfides. The most preferred compounds are 3,3'-bis(triethoxysilylpropyl)disulfide and 3,3'-bis(triethoxysilylpropyl)tetrasulfide. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT-Z™ from Momentive Performance Materials.

In another embodiment, suitable sulfur containing organosilicon compounds include compounds disclosed in U.S. Publication 2006/0041063. In one embodiment, the sulfur containing organosilicon compounds include the reaction product of hydrocarbon based diol (e.g., 2-methyl-1,3-propanediol) with S-[3-(triethoxysilyl)propyl]thiooctanoate. In one embodiment, the sulfur containing organosilicon compound is NXT-Z™ from Momentive Performance Materials. In another embodiment, suitable sulfur containing organosilicon compounds include those disclosed in United States Patent Publication 2003/0130535. In one embodiment, the sulfur containing organosilicon compound is Si-363 from Degussa.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The silylated triglyceride oil modified rubber formulations of this invention can be utilized in manufacturing a wide variety of products, such as tires, power transmission belts, conveyor belts, tracks, air springs, asphalt modification polymers, adhesives, shoe soles, windshield wiper blades, bowling balls, golf balls, energy absorbing foot pads, and the like. These resin modified rubbers can be incorporated in a number of tire components. For example, the resin modified oil extended rubbers of this invention can be utilized in tire treads (including tread outer cap layer and tread inner cap layer) and tire sidewalls. They can also be employed in tire apex, chafer, sidewall insert, wirecoat and innerliner formulations.

The pneumatic tire of the present invention may be a race tire, passenger tire, aircraft tire, agricultural, earthmover, off-the-road, truck tire, and the like. Generally, the tire will be a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The rubber which is modified in accordance with this invention can also be oil extended. The oil composition used in the oil extension of the rubber will typically be employed at a level which is within the range of about 5 phr to 100 phr (parts per 100 parts of rubber by weight). In other words, from about 5 phr to about 100 phr of the oil composition will be added to the rubber cement (in the case of solution polymers) or to the rubber emulsion (in the case of emulsion polymers). In most cases, the oil composition will be added at a level which is within the range of 6 phr to 80 phr. In many cases, the oil composition will be added at a level which is within the range of 8 phr to 60 phr. The oil composition will preferably be added at a level which is within the range of 10 phr to 40 phr.

The oil used in making the oil extended rubber can be a petroleum based oil, such as a highly aromatic oil, an aromatic oil, a naphthenic oil, a paraffinic oil, or a mixture thereof. The petroleum based oil utilized can be Type 101, Type 102, Type 103, or Type 104 as delineated by ASTM Designation D2226 or a mixture thereof. Low PCA oils, such as MES, TDAE, and heavy naphthenic oils can also be used. Suitable low PCA oils include, but are not limited to, mild extraction solvates (MES), treated distillate aromatic extracts (TDAE), and heavy naphthenic oils as are known in the art and further described in U.S. Pat. Nos. 5,504,135, 6,103,808, 6,399,697, 6,410,816, 6,248,929, 6,146,520, United States Patent Publication 2001/00023307, United States Patent Publication 2002/0000280, United States Patent Publication 2002/0045697, United States Patent Publication 2001/0007049, EP0839891, JP2002097369, and ES2122917 which are incorporated herein by reference for the purpose of disclosing suitable oils. Generally, suitable oils include low PCA oils and include those having a glass transition temperature Tg in a range of from about −40° C. to about −80° C., MES oils generally have a Tg in a range of from about −57° C. to about −63° C., TDAE oils generally have a Tg in a range of from about −44° C. to about −50° C., heavy naphthenic oils generally have a Tg in a range of from about −42° C. to about −48° C. A suitable measurement for Tg of TDAE oils is DSC according to ASTM E1356, or equivalent thereto.

Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. In one embodiment, the low PCA oils may be an MES, TDAE or heavy naphthenic types having characteristics as identified in the following table:

|  | MES | TDAE | Heavy Naphthenic |
|---|---|---|---|
| Aromatics | 11% to 17% | 25% to 30% | 11% to 17% |
| Specific Gravity @15° C. | 0.895-0.925 kg/l | 0.930-0.960 kg/l | 0.920-0.950 kg/l |
| Viscosity @40° C. | 150-230 cSt | 370-430 cSt | 350-820 |
| Viscosity @100° C. | 13-17 cSt | 16-22 cSt | 17-33 cSt |
| Refractive Index | 1.495-1.510 | 1.520-1.540 | 1.500-1.520 |
| Tg Inflection | −60° C. ± 3° C. | −47° C. ± 3° C. | −45° C. ± 3° C. |
| Aniline Point | 85° C.-100° C. | | |
| Pour Point | 0° C. maximum | 30° C. maximum | 0° C. maximum |
| DMSO [IP 346] | <2.9% | <2.9% | <2.9% |
| Flashpoint | >220° C. | >240° C. | >240° C. |

In one embodiment, the low PCA oils may be an MES type that is a complex combination of hydrocarbons predominantly comprised of saturated hydrocarbons in the range of $C_{20}$ to $C_{50}$ obtained by (1) solvent extraction of heavy petroleum distillate; or (2) treating of heavy petroleum distillate with hydrogen in the presence of a catalyst; followed by solvent dewaxing. In one embodiment, the low PCA oil contains not more than 1 mg/kg of benzo(a)pyrene, and not more than 10 mg/kg total of the following polycyclic aromatic hydrocarbons: benzo(a)pyrene, benzo(e)pyrene, benzo(a)anthracene, benzo(b)fluoranthene, benzo(j)fluoranthene, benzo(k)fluoranthene, dibenzo(a,h)anthracene, and chrysene. Suitable TDAE oils are available as Tudalen SX500 from Klaus Dahleke KG, VivaTec 400 and VivaTec 500 from H&R Group, and Enerthene 1849 from BP, and Extensoil 1996 from Repsol. The oils may be available as the oil alone or along with an elastomer in the form of an extended elastomer.

In the practice of this invention it is preferred for the oil to be a triglyceride oil, such as a vegetable oil. The following table lists a number of triglyceride oils that can be utilized and shows the approximate saturation, mono-unsaturation and poly-unsaturation contents of these vegetable oils (triglyceride oils). It is preferred for the vegetable oil used to have an iodine value of less than 135 and preferably less than 130.

| Vegetable Oil | Saturated | Mono Unsaturated | Poly Unsaturated |
|---|---|---|---|
| Soybean | 16% | 45% | 40% |
| Canola (Rapeseed) | 7% | 63% | 28% |
| Corn | 13% | 28% | 55% |
| Coconut | 87% | 6% | 2% |
| Cottonseed | 26% | 18% | 52% |
| Olive | 14% | 73% | 11% |
| Palm | 49% | 37% | 9% |
| Peanut | 17% | 46% | 32% |
| Safflower | 10% | 45% | 40% |
| High oleic soybean oil | 10% | 86% | 4% |

Genetically modified soybeans can also be used as the source of soybean oil that is employed in the practice of this invention. Such soybean oil has a much higher oleic acid content and is sometimes referred to as high oleic acid soybean oil (HOSBO). In any case, HOSBO typically contains about 74.5% oleic acid.

The silica utilized in the rubber formulations of this invention can include pyrogenic siliceous pigments, precipitated siliceous pigments and highly dispersible precipitated silicas, although highly dispersible precipitated silicas are preferred. The siliceous pigments preferably employed in this invention are precipitated silicas such as, for example, those obtained by the acidification of a soluble silicate, e.g., sodium silicate. As a general rule, the silica will have an average particle size that is within the range of about 4 nm to 120 nm, and will preferably have a particle size that is within the range of 7 nm to 60 nm. Such silicas might be characterized, for example, by having a BET surface area, as measured using nitrogen gas, preferably in the range of about 40 to about 600, and more usually in a range of about 50 to about 300 square meters per gram. The silica will preferably have a BET surface area that is within the range of about 125 m²/g to about 250 m²/g. The BET method of measuring surface area is described in the Journal of the American Chemical Society, Volume 60, page 304 (1930).

The silica may also be typically characterized by having a dibutylphthalate (DBP) absorption value in a range of about 100 to about 400 ml/100 g, and more usually about 150 to about 300 ml/100 g. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in the practice of this invention. Some representative examples of silica that can be used in the practice of this invention includes, but is not limited to, silicas commercially available from PPG Industries under the Hi-Sil trademark, such as Hi-Sil® 210, Hi-Sil® 233 and Hi-Sil® 243, silicas commercially available from PPG Industries under the Agilon® trademark, such as Agilon® 400G, Agilon® 454G and Agilon® 458G, silicas available from Solvay, with, for example, designations of Zeosil®1085Gr, Zeosil®1115MP, Zeosil®1165MP, Zeosil® Premium and ZHRS®1200MP, and silicas available from Evonik Industries with, for example, designations Ultrasil® 5000GR, Ultrasil® 7000GR, Ultrasil® VN2, Ultrasil® VN3, and BV9000GR, and silicas available from Huber Engineered Materials with, for example, designations of Zeopol® 8745, and Zeopol® 8755LS.

The silica coupling agent will typically be a compound of the formula:

$$Z\text{-Alk-}S_n\text{-Alk-}Z \qquad (I)$$

$$Z\text{-Alk-}S_n\text{-Alk} \qquad (II)$$

$$Z\text{-Alk-SH} \qquad (III)$$

$$Z\text{-Alk} \qquad (IV)$$

$$Si(OR^1)_4 \qquad (V)$$

in which Z is selected from the group consisting of:

wherein $R^1$ is an alkyl group containing from 1 to 4 carbon atoms, a cyclohexyl group, or a phenyl group; wherein $R^2$ is an alkoxy group containing from 1 to 8 carbon atoms, or a cycloalkoxy group containing from 5 to 8 carbon atoms; wherein Alk is a divalent hydrocarbon of 1 to 18 carbon atoms and wherein n represents an integer from 2 to 8. The mercaptosilanes and blocked mercaptosilanes that can be used in the practice of this invention are described in International Patent Publication No. WO 2006/076670. The teachings of WO 2006/076670 are incorporated herein by reference for the purpose of describing specific mercaptosilanes and blocked mercaptosilanes that can be used in the practice of this invention. The teachings of WO 03091314 are also incorporated herein by reference for the purpose of describing specific silanes that can be utilized in the practice of this invention which emit low levels of volatile organic compounds or no volatile organic compounds.

Specific examples of sulfur containing organosilicon compounds which may be used as the silica coupling agent in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide, (3-Mercaptopropyl) trimethoxysilane, (3-Mercaptopropyl)triethoxysilane and 3-(Triethoxysilyl)propyl thiooctanoate.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Therefore, with respect to formula I, Z is preferably wherein $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the silica coupling agent that should be incorporated into the elastomeric compositions of this invention will vary depending on the level of the siliceous fillers that are included in the rubbery composition. Generally speaking, the amount of the silica coupling agent used will range from about 0.01 to about 15 parts by weight per hundred parts by weight of the siliceous fillers. Preferably, the amount of silica coupling agent utilized will range from about 1 to about 12 parts by weight per hundred parts by weight of the siliceous fillers. Preferably, the amount of silica coupling agent utilized will range from about 2 to about 10 parts by weight per hundred parts by weight of the siliceous fillers. More preferably the amount of the silica coupling agent included in the elastomeric compositions of this invention will range from about 6 to about 10 parts by weight per hundred parts by weight of the siliceous fillers.

The rubbery compositions of this invention can be compounded utilizing conventional ingredients and standard techniques. For instance, the elastomeric compositions of this invention will typically be mixed with carbon black, sulfur, additional fillers, accelerators, oils, waxes, scorch inhibiting agents, and processing aids in addition to the reinforcing silica filler.

In most cases, the elastomeric compositions of this invention will be compounded with sulfur and/or a sulfur containing compound, at least one filler, at least one accelerator, at least one antidegradant, at least one processing oil, zinc oxide, optionally a hydrocarbon resin, optionally a reinforcing resin, optionally one or more fatty acids, optionally a peptizer and optionally one or more scorch inhibiting agents. Such elastomeric compositions will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally the total amount of fillers utilized in the elastomeric blends of this invention will be within the range of 5 phr to 160 phr. In tire tread formulations for passenger cars, fillers will typically be present at a level within the range of 20 phr to 140 phr, with it being preferred for such blends to contain from 40 phr to 120 phr fillers, and with it most preferred in some applications for the filler to be present at a level within the range of 60 phr to 120 phr. As has been explained, the filler can be comprised solely of the reinforcing silica filler. However, in most cases at least some carbon black will be utilized in such elastomeric compositions. If carbon black is also present, the amount and type of carbon black, if used, may vary. Generally speaking, the amount of carbon black will vary from about 1 phr to about 80 phr. Preferably, the amount of carbon black will range from about 3 phr to about 50 phr.

In manufacturing some products, non-reinforcing fillers and semi-reinforcing fillers can be included in the rubber formulation as an extender. Some representative examples of such non-reinforcing fillers and semi-reinforcing fillers include clay, talc, lignin, diatomaceous earth, calcium carbonate, titanium dioxide, aluminum-trihydrate, and the like. Starch can also be included to attain good results in some cases. In any case, the blend will also normally include from 0.1 to 2.5 phr of at least one accelerator with 0.2 phr to 1.5 phr being preferred. Antidegradants, such as antioxidants and antiozonants, will generally be included in the rubbery blends of this invention in amounts ranging from 0.25 phr to 10 phr with amounts in the range of 1 phr to 5 phr being preferred. Processing oils can be included in the blend to improve processing and reduce compound modulus although some blends, especially those based on natural rubber, may contain no processing oil. Processing oils, when present, will generally be included in the blend in amounts ranging from 2 phr to 100 phr with amounts ranging from 5 phr to 50 phr being preferred. Zinc oxide can be included in the blend as a cure activator but in some cases may not be present. Zinc oxide, when present, will normally be included in the blends from 0.5 phr to 10 phr of zinc oxide with 1 to 5 phr being preferred. These blends can optionally contain up to about 15 phr of hydrocarbon resins, up to about 10 phr of reinforcing resins, up to about 10 phr of fatty acids, up to about 10 phr of processing aid, up to about 2.5 phr of peptizers, and up to about 1 phr of scorch inhibiting agents.

Examples of processing aids that are suitable for this purpose are: fatty acids, fatty alcohols, fatty amines, fatty amides, fatty esters, fatty acid metal salts, polyols, polyethylene glycols, polypropylene glycols and natural or synthetic hydrocarbon waxes and combinations and blends thereof.

Examples of hydrocarbon resins that are suitable for this purpose are: asphalt, bitumen, indene-coumarone resins, C9 resins, C5 resins, C5/C9 resins, alkylated hydrocarbon resins, aromatic petroleum resins, styrene resins, alpha-methyl-styrene resins, styrene-alpha-methyl-styrene copolymer resins, phenolic tackifying resins, dicyclopentadiene (DCPD) resins, terpene resins, polybutene resins, rosin acids, rosin esters, dimerized rosin resins and combinations and blends thereof, etc. For example, and not intended to be limiting, see U.S. Pat. Nos. 6,525,133, 6,242,523, 6,221,953, and 5,901,766.

The silica compounding additives described in U.S. Pat. No. 10,087,306 can also be included in the silylated triglyc- eride oil modified rubber formulations of this invention. These silica compounding additives are of the structural formula:

wherein M represents a divalent metal, and wherein $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups. In most cases, M will be selected from the group consisting of zinc, calcium and magnesium. For instance, $R^1$ can represent a hydrogen atom and $R^2$ can represent an alkyl group containing from 1 to 20 carbon atoms. In the alternative, $R^1$ can represent a hydrogen atom and $R^2$ can represent an alkyl group containing from 6 to 18 carbon atoms. In the case of M being zinc or magnesium, the silica compounding additive can be of the structural formula:

wherein $R^1$ and $R^2$ can be the same or different and are selected from the group consisting of hydrogen atoms, alkyl groups, alkylene groups, hydroxyl substituted alkyl or alkylene groups, amine substituted alkyl or alkylene groups and thiol substituted alkyl or alkylene groups. For instance, the silica compounding additive can be zinc glycerolate, calcium glycerolate or magnesium glycerolate. Zinc glycerolate is of the structural formula:

wherein $R^1$ represents a hydrogen atom.

Such silica compounding additives can be mixed into a desired rubber formulation utilizing any conventional procedure which results in thorough mixing to attain any essentially homogeneous formulation. For instance, the silica compounding additive can be blended into the rubber formulation with a banbury mixer, a mill mixer, an extruder, a continuous mixer, various additional types of internal mixers and the like. In some embodiments of this invention the silica compounding additive can be introduced into the rubbery polymer as a masterbatch. For instance, the silica compounding additive can be pre-blended into any desired rubbery polymer, filler, processing aid, hydrocarbon resin, process oil or combinations thereof. The silica compounding additive can be blended into the rubbery polymer during either the non-productive or productive mixing stage utilized in preparing the rubber formulation. However, to maximize mixing time and to attain the best possible dispersion, it is typically advantageous to add the silica compounding additive during the non-productive mixing stage utilized in making the rubber formulation. The teachings of U.S. Pat. No. 10,087,306 are incorporated herein by reference for the purpose of describing such silica compounding additives and their used in rubber formulations.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

A glass UV reactor was used for photocatalytic thiol-ene reactions. The reactor was equipped with a water-cooled, jacketed internal illumination well. The light source was a medium pressure, Hg vapor lamp. The Hg lamp was fitted with a Pyrex Absorp Sleeve to eliminate wavelengths below ~300 nm. All product structures and degrees of functionalization were confirmed by 1H and 13C NMR spectroscopy.

Example 1: Synthesis of HOSBO-MPTES

Figure 1:
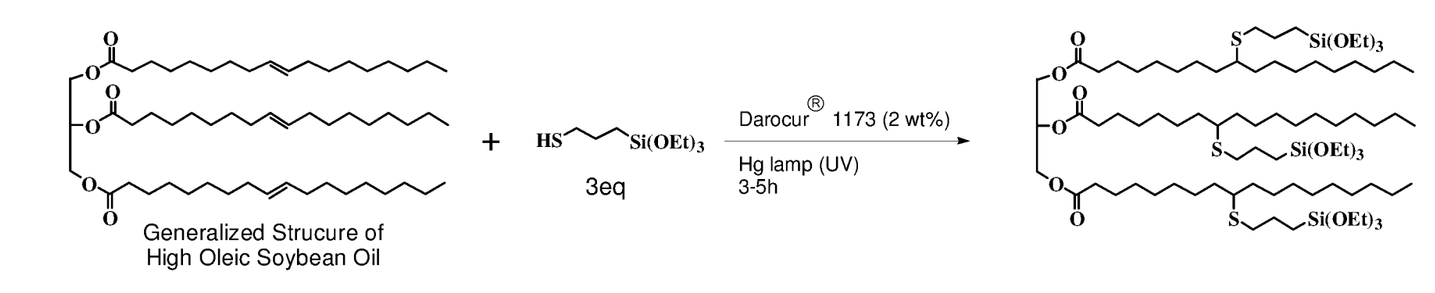
FIG. 1 shows the synthesis of HOSBO-MPTES as described in Example 1.

High oleic soybean oil (HOSBO) (200 g, 0.227 mol), 3-mercaptoproyltriethoxysilane (MPTES) (3 eq, 164.9 mL, 0.682 mol), and 1173 photoinitiator (2-hydroxy-2-methylpropiophenone; 2 wt %, 3.6 mL) were added to the UV reactor neat. The reaction mixture was stirred with internal illumination at room temperature for 3 hours. After this time, 1H NMR analysis showed that 91% of the olefins had been thiolated. When desired, HOSBO-MPTES could be purified by removing 1173 and any unreacted 3-mercaptoproyltriethoxysilane under vacuum. This reaction scheme is illustrated in FIG. 1.

The 3-mercaptoproyltriethoxysilane and 2-hydroxy-2-methylpropiophenone can optionally be removed from the silyated triglyceride oil by distillation or by other appropriate means. However, it may be advantageous to simply leave the residual 3-mercaptoproyltriethoxysilane in the recovered silylated triglyceride oil in which case it will act as a coupling agent as known in the prior art. Persons skilled in the art of rubber compounding will adjust the level of coupling agent and/or curatives utilized appropriately to attain desired cured rubber properties.

Example 2: Synthesis of HOSBO-MPTES (99% Olefin Content Functionalized)

Procedure A:
High oleic soybean oil (500 g, 0.569 mol), 3-mercaptoproyltriethoxysilane (3 eq, 412 mL, 1.706 mol), and 1173 (2-hydroxy-2-methylpropiophenone; 2 wt %, 9 mL) were added to the UV reactor neat. The reaction mixture was stirred with external illumination at room temperature for 8 hours. After this time, 1H NMR analysis showed that 99% of the olefins had been thiolated. When desired, HOSBO-MPTES could be purified by removing 1173 and any unreacted 3-mercaptoproyltriethoxysilane under vacuum.

Procedure B:
High oleic soybean oil (500 g, 0.569 mol), 3-mercaptoproyltriethoxysilane (3 eq, 412 mL, 1.706 mol), and DMPA (2,2-dimethoxy-2-phenylacetophenone; 2 wt %, 10 g) were added to the UV reactor neat. The reaction mixture was stirred with external illumination at room temperature for 8 hours. After this time, 1H NMR analysis showed that 99% of the olefins had been thiolated. When desired, HOSBO-MPTES could be purified by removing any unreacted 3-mercaptoproyltriethoxysilane under vacuum.

Example 3: Synthesis of HOSBO-MPTES (42% Olefin Content Functionalized)

High oleic soybean oil (200 g, 0.227 mol), 3-mercaptoproyltriethoxysilane (1.83 eq, 100.6 mL, 0.416 mol), and 1173 (2-hydroxy-2-methylpropiophenone; 2 wt %, 3.6 mL) were added to the UV reactor neat. The reaction mixture was stirred with external illumination at room temperature for 5 hours. After this time, 1H NMR analysis showed that 42% of the olefins had been thiolated. When desired, HOSBO-MPTES could be purified by removing 1173 and any unreacted 3-mercaptoproyltriethoxysilane under vacuum.

Example 4: Synthesis of HOSBO-MPTES (23% Olefin Content Functionalized)

High oleic soybean oil (200 g, 0.227 mol), 3-mercaptoproyltriethoxysilane (0.92 eq, 50.4 mL, 0.182 mol), and 1173 (2-hydroxy-2-methylpropiophenone; 2 wt %, 3.6 mL) were added to the UV reactor neat. The reaction mixture was stirred with external illumination at room temperature for 5 hours. After this time, 1H NMR analysis showed that 23% of the olefins had been thiolated. When desired, HOSBO-MPTES could be purified by removing 1173 and any unreacted 3-mercaptoproyltriethoxysilane under vacuum.

Example 5: Mixing of Rubber Compounds

HOSBO-MPTES derivatives were evaluated in silica rubber compositions with styrene-butadiene (SBR)/polybutadiene (PBd) polymer blends. The general formulation is given below in Table 1. The rubber compounds were mixed in a 360 cc Haake mixer, using 100 phr SBR and PBd polymer, 65 phr silica, 20 phr oil, and 8.5 phr additives in the first stage. The non-productive stage 1 combined all ingredients, except the sulfur and curatives, and was mixed for 2 minutes at 160° C. The final, productive stage 2 of mixing added 1.5 phr sulfur and 4.25 phr curatives. The productive stage was mixed for 2 minutes reaching a temperature of approximately 105° C. Samples were cured at 160 C for 20 minutes.

TABLE 1

| Ingredient | Phr |
|---|---|
| Stage 1 - 2 min, 160° C. | |
| Polymer[1] | 100 |
| Silica[2] | 65 |
| Naphthenic Oil[3] | 6.7-20 |
| HOSBO-MPTES | |
| Sample A | 0 |
| Sample B | 6.5 |
| Sample C | 13 |
| Sample D | 19.5 |
| Sample E | 0 |
| Sample F | 0 |
| Sample G | 6.7 |
| Sample H | 0 |
| Sample I | 13.3 |
| Sample J | 0 |

TABLE 1-continued

| Ingredient | Phr |
|---|---|
| Sample K | 19.5 |
| Sample L | 19.5 |
| Unreacted blend of HOSBO & MPTES | |
| Sample E (HOSBO, MPTES) | 10.75, 8.75 |
| Si 266[4] | 0-6.5 |
| Additives[5] | 8.5 |
| Stage 2 2 min, 110° C. | |
| Sulfur[6] | 1.5 |
| Curatives[7] | 4.25 |

Control Samples A and F contained 100 phr of an SBR/PBd 70/30 blend by weight, 65 phr silica, 20 phr naphthenic oil, 6.5 phr Si 266, and no soy-silane derivative.
Control Sample E contained 100 phr of an SBR/PBd 70/30 blend, 65 phr silica, 20 phr naphthenic oil, no Si 266, and 19.5 phr of an unreacted blend of HOSBO and MPTES.
Experimental Samples B-D contained 100 phr of an SBR/PBd 70/30 blend, 65 phr silica, 20 phr naphthenic oil, no Si 266, and 6.5-19.5 phr of HOSBO-MPTES99
Experimental Sample G contained 100 phr of an SBR/PBd 70/30 blend, 65 phr silica, 13.3 phr naphthenic oil, 6.5 phr Si 266, and 6.7 phr HOSBO-MPTES99.
[1]70% Solflex 16S42, a medium vinyl solution butadiene-styrene copolymer with 16% bound styrene and 42% 1,2-vinyl content; 30% Budene 1207, from The Goodyear Tire & Rubber Company.
[2]Precipitated silica from Solvay, Zeosil 1165MP ™
[3]Supplied by Cross Oil Refining & Marketing, Cross Corsol 100, heavy naphthenic process oil
[4]Si 266 ® bis-(3-triethoxysilylpropyl)disulfide from Evonik Industries
[5]Combination of fatty acids (stearic, palmitic, and oleic), carbon black from Tokai Carbon, and waxes (microcrystalline and/or paraffinic)
[6]Elemental sulfur from "Siarkopol" Tarnobrzeg Chemical Plants LTD.
[7]Diphenyl guanidine and sulfenamide sulfur cure accelerators Table 2 shows an initial ladder study using HOSBO-MPTES99 versus control Sample A and negative control Sample E.

TABLE 2

Rubber composition properties, Samples A-E

| | Control Sample A | Sample B | Sample C | Sample D | Control Sample E |
|---|---|---|---|---|---|
| HOSBO-MPTES99 | — | 6.5 | 13 | 19.5 | — |
| Unreacted mixture of HOSBO & MPTES | — | — | — | — | 19.5 |
| Naphthenic oil | 20 | 20 | 20 | 20 | 20 |
| Si 266 | 6.5 | — | — | — | — |
| Uncured G' @0.833 Hz (KPa) | 166 | 143 | 124 | 110 | 308 |
| Tan δ @ 10% strain, 3rd strain sweep | 0.14 | 0.15 | 0.13 | 0.12 | 0.18 |
| M300% (MPa) | 9.1 | 4.0 | 8.8 | 5.3 | 4.3 |
| Elongation at break (%) | 460 | 627 | 356 | 479 | 592 |

Table 3 shows a control compared to a compound for which the rheological properties were tuned to minimize tradeoffs and maximize improvements.

TABLE 3

Rubber composition properties, Samples F-G

| | Control Sample F | Sample G | Control Sample H | Sample I |
|---|---|---|---|---|
| HOSBO-MPTES99 | — | 6.7 | — | 13.3 |
| Naphthenic oil | 20 | 13.3 | 20 | 6.7 |
| Si 266 | 6.5 | 6.5 | 3.25 | 3.25 |
| Uncured G' @0.833 Hz (KPa) | 200 | 194 | 269 | 225 |
| Tan δ @10% strain | 0.13 | 0.11 | 0.13 | 0.10 |
| M300% (MPa) | 9.0 | 9.7 | 7.8 | 10.2 |
| Elongation at break (%) | 481 | 444 | 520 | 405 |

Uncured Rubber Compound Processing

Sample B shows that when the HOSBO-MPTES99 loading is 6.5 phr, improved processing at 143 KPa is observed, versus 166 KPa for the control. When the loading of HOSBO-MPTES99 in Sample C is increased to 13.5 phr, the uncured G' drops further to 124 KPa. Increasing the HOSBO-MPTES99 loading further in Sample D to 19.5 phr, the uncured viscosity decreases further to 110 KPa. This ladder study showed that the uncured G' decreased with increased loading of the soy-silane, which corresponds to improved processability. Negative control Sample E using unreacted, crude HOSBO and MPTES has an uncured G' of 308 KPa, corresponding to worse processability. This supports the conclusion that the MPTES must be chemically reacted with the HOSBO to see the same properties.

Control Sample F in Table 3 shows an uncured G' of 200 KPa. This processability indicator is virtually unchanged in Sample G at 194 KPa when Si 266 is left in the compound. This is achieved by balancing the drop from HOSBO-MPTES99 observed in uncured G' in Table 2 with the increase in G' that a combination of less oil and more Si 266 contribute. Therefore, Sample G has an acceptable uncured viscosity that is practically identical to the control Sample F. Control Sample H shows a slightly stiffer uncured G' of 269 KPa versus control Sample F when the Si 266 loading is halved. In Sample I, HOSBO-MPTES99 is added, while approximately two-thirds of the naphthenic oil is removed. Typically, removing oil from a compound would make it stiffer. However, the uncured G' property is improved in Sample I, softening the compound versus control Sample H to 225 KPa. The presence of HOSBO-MPTES99 has therefore lowered the uncured G' close to control Sample F, while using half the Si 266 loading and one-third the naphthenic oil loading of control Sample F.

While the above results are not completely understood, it is envisioned that the large, hydrophobic nature of the fatty acid chains on the triglyceride contribute a plasticizing effect as the soy-silane hydrophobates the surface of the silia particles. This better solubilizes the material in the rubber matrix, providing a softer uncured compound.

Cured Rubber Compound Hysteresis

Table 2 shows an increase in tan δ when the loading is below a certain threshold in Sample B. However, the tan δ showed a marked drop (7%) in Sample C compared to the control Sample A when the HOSBO-MPTES99 loading was doubled to 13 phr. The tan δ is 14% lower than control Sample A when the HOSBO-MPTES99 loading is increased further in Sample D.

Table 3 shows control Sample F has a tan δ of 0.13. Adjusting the loading of oil and Si 266 versus the HOSBO-MPTES9, the tan δ for Sample G decreases 15% to 0.11. Negative control Sample E has a much higher tan δ compared to control Sample A, again showing that it is critical for MPTES to be chemically bound to the HOSBO to obtain the properties seen in Samples B-D. Decreasing the Si 266 loading by half, while keeping the naphthenic oil loading at 20 phr in control Sample H results in a tan δ of 0.13, identical to control Sample F. Halving the loading of Si 266 and decreasing the naphthenic oil loading by two-thirds in Sample I gives a tan δ of 0.10, which is approximately 23% lower than control Samples F and H, and about 9% lower than Sample G. Therefore, by tuning the amounts of oil and coupler in a rubber composition, the use of HOSBO-MPTES99 will provide a drop in tan δ.

This drop in tan δ is an indicator for reduced hysteresis, which correlates to a reduction of heat buildup in the cured rubber. The lower tan δ is an indicator for improved rolling resistance when the rubber composition is used in a tire component, for example the tread.

Tensile Strength

The tensile data in Table 2 shows control Sample A has an elongation at break (EB) of 460%, with a 300% modulus (M300%) of 9.1 MPa. Eliminating Si 266 and adding 6.5 phr HOSBO-MPTES99 (Sample B), the EB increases to 627%, but the M300% falls to 4.0 MPa. At 13 phr HOSBO-MPTES99 in Sample C, EB decreases to 356% compared to Sample A and B, while the M300% increases versus Sample B to 8.8 MPa, but remains lower than control Sample A. At the highest loading of HOSBO-MPTES99 in Sample D, EB is approximately equal to control Sample A and greater than Samples B-C at 479%, but the M300% has decreased to 5.3 MPa (lower than Sample C, higher than Sample B). Negative control Sample E has the second highest EB at 592%, but the M300% has decreased to 4.3 MPa versus control Sample A and is approximately equal to the M300% of Sample B.

The tensile data in Table 3 shows Sample G has an EB of 444%, which is approximately equal to control Sample F's EB of 481%. The M300% for Sample G is slightly higher at 9.7 MPa versus control Sample F at 9.0 MPa. Halving the Si 266 loading in control Sample H versus control Sample F decreases the M300% to 7.8, while increasing the EB to 520%. Introducing HOSBO-MPTSE99 at the halved level of Si 266 with one-third the naphthenic oil of control Sample H decreases the EB to 405% and increases M300% to 10.2. Although the EB is slightly lower than control Sample F, it is well within acceptable parameters.

Table 3 shows the ability to balance the M300% with EB by reintroducing Si 266 to the mix with HOSBO-MPTES99. These properties indicate Sample G is of comparable toughness to control Samples A and F, with approximately the same M300%. The tunability of the compound properties is further demonstrated by Sample I, which shows that significantly lower loadings of oil and coupler may be used in combination with the addition of HOSBO-MPTES99 to achieve similar tensile properties as control Samples A and F.

CONCLUSIONS

Comparing several rubber compositions using HOSBO-MPTES99 to controls without HOSBO-MPTES99, it is evident that the presence of HOSBO-MPTES99 gives rise to a range of altered compound properties. A negative control was also compounded using an unreacted mixture of HOSBO and MPTES. This compound exhibited a higher uncured viscosity, a high degree of scorch, and an increase in the tan δ value. This negative control shows that it is critical for the MPTES to be chemically reacted prior to mixing to obtain desirable compound properties.

The range of property changes the presence of soy-silane can induce provides an opportunity for the compounder to adjust the recipe to target desired properties. By adjusting the amount of oil, coupler, and soy-silane, the properties of the resulting compound were tuned to give an improved tan δ, while retaining other compound properties. In one example, we were able to maintain the tensile properties (elongation at break and M300%) and processability (uncured G'), while improving the tan δ by 15% compared to the control. In another example, we were able to maintain the tensile properties (elongation at break and M300%) and processability (uncured G'), while improving the tan δ by 23% compared to the control.

TABLE 4

Rubber composition properties, Samples H-J

|  | Control Sample J | Sample K | Sample L |
|---|---|---|---|
| HOSBO-MPTES23 | — | 19.5 | — |
| HOSBO-MPTES42 | — | — | 19.5 |
| Napthenic oil | 20 | 20 | 20 |
| Si 266 | 6.5 | — | — |
| Uncured G' @0.833 Hz (KPa) | 165 | 101 | 103 |
| Tan δ @ 10% strain, $3^{rd}$ strain sweep | 0.15 | 0.11 | 0.11 |
| M300% (MPa) | 9.4 | 2.9 | 3.4 |
| Elongation at break (%) | 469 | 757 | 702 |

Table 4 shows the associated compound properties when using partially-functionalized soy-silanes are used. In these cases, HOSBO was reacted with MPTES such that the olefin content was 23% or 42% functionalized with MPTES.

Compounding with Partially Functionalized HOSBO-MPTES

Partially-functionalized soy-silanes behave similarly to the fully functionalized HOSBO-MPTES99 and differently from the control, for example when HOSBO-MPTES23 and HOSBO-MPTES42 are used. As soy-silane is added to the mix, the uncured rubber compositions' uncured G' decreases. The tan δ for Samples K and L decrease by 27% compared to control Sample J. The cured EB for Sample K increases to 757%, while Sample J increases to 702% versus Sample J's EB of 469%. The M300% for Samples K and L decrease to 2.9 MPa and 3.4 MPa, respectively. These data follow the same trend observed in Table 2, where HOSBO-MPTES99 was used without Si 266. It is logical that by tuning the loading of HOSBO-MPTES23/HOSBO-MPTES42, oil, and coupler, the properties of the resulting rubber composition could be tuned.

While certain representative embodiments and details have been shown for the purpose of illustrating the subject invention, it will be apparent to those skilled in this art that various changes and modifications can be made therein without departing from the scope of the subject invention.

What is claimed is:

1. A rubber formulation which is comprised of (1) a rubbery polymer, (2) a reinforcing silica, and (3) a silylated triglyceride oil, wherein the silylated triglyceride oil includes silyl groups of the structural formula: —$(CH_2)_n$—Si(OR)$_3$, wherein n represents an integer within the range of 1 to 8, and wherein R represents an alkyl group containing from 1 to 8 carbon atoms.

2. The rubber formulation as specified in claim 1 wherein reinforcing silica is present at a level which is within the range of 5 phr to 160 phr.

3. The rubber formulation as specified in claim 2 wherein the silylated triglyceride oil is present at a level which is within the range of 1 phr to 40 phr.

4. The rubber formulation as specified in claim 3 wherein the rubber formulation is further comprised of carbon black.

5. The rubber formulation as specified in claim 4 wherein the rubber formulation is further comprised of a silica coupling agent.

6. The rubber formulation as specified in claim 1 wherein n represents an integer within the range of 3 to 5, wherein R represents an alkyl group containing from 2 to 4 carbon atoms.

7. The rubber formulation as specified in claim 1 wherein the silylated triglyceride oil includes silyl groups of the structural formula: —$(CH_2)_3$—Si(O—$CH_2CH_3$)$_3$.

8. The rubber formulation as specified in claim 1 wherein reinforcing silica is present at a level which is within the range of 50 phr to 120 phr.

9. The rubber formulation as specified in claim 8 wherein the silylated triglyceride oil is present at a level which is within the range of 3 phr to 30 phr.

10. The rubber formulation as specified in claim 9 wherein the rubber formulation is further comprised of carbon black and wherein the carbon black is present at a level of at least 0.5 phr.

11. The rubber formulation as specified in claim 10 wherein the rubber formulation is further comprised of a silica coupling agent.

12. The rubber formulation as specified in claim 1 wherein the triglyceride oil is a vegetable oil.

13. The rubber formulation as specified in claim 1 wherein the triglyceride oil selected from the group consisting of soybean oil, sunflower oil, canola (rapeseed) oil, corn oil, coconut oil, cottonseed oil, olive oil, palm oil, peanut oil, and safflower oil.

14. The rubber formulation as specified in claim 1 wherein the triglyceride oil is soybean oil.

15. The rubber formulation as specified in claim 1 wherein the triglyceride oil is corn oil.

16. The rubber formulation as specified in claim 1 which is further comprised of a non-reinforcing selected from the group consisting of clay, talc, calcium carbonate, and diatomaceous earth.

17. The rubber formulation as specified in claim 1 wherein the silylated triglyceride oil is at least 30% silylated.

18. A tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread and/or the sidewalls are comprised of the rubber formulation as specified in claim 1.

* * * * *